(12) United States Patent
Besesty et al.

(10) Patent No.: US 9,082,558 B2
(45) Date of Patent: Jul. 14, 2015

(54) ARRANGEMENT FOR SUPERCAPACITOR DEVICE, SUPERCAPACITOR DEVICE COMPRISING THE ARRANGEMENT, METHOD FOR FABRICATING AN ARRANGEMENT

(71) Applicant: Commissariat a L'energie Atomique et aux Energies Alternatives, Paris (FR)

(72) Inventors: Pascal Besesty, Vaulnaveys le Haut (FR); Gerard Bidan, Grenoble (FR); Emmanuel Hadji, Fontaine (FR)

(73) Assignee: Commissariat a L'energie Atomique et aux Energies Alternatives, Paris (FR)

(*) Notice: Subject to any disclaimer, the term of this patent is extended or adjusted under 35 U.S.C. 154(b) by 85 days.

(21) Appl. No.: 13/926,010

(22) Filed: Jun. 25, 2013

(65) Prior Publication Data
US 2013/0342963 A1  Dec. 26, 2013

(30) Foreign Application Priority Data

Jun. 25, 2012 (FR) .................................... 12 55976

(51) Int. Cl.
*H01G 9/00* (2006.01)
*H01G 11/24* (2013.01)
*H01G 11/10* (2013.01)
*H01G 11/28* (2013.01)
(Continued)

(52) U.S. Cl.
CPC ............... *H01G 11/24* (2013.01); *H01G 11/10* (2013.01); *H01G 11/28* (2013.01); *H01G 11/52* (2013.01); *B82Y 99/00* (2013.01); *Y02E 60/13* (2013.01); *Y10S 977/948* (2013.01); *Y10T 29/417* (2015.01)

(58) Field of Classification Search
USPC ......... 361/502, 503–504, 509–512, 516–519, 361/523–525, 528–529, 530
See application file for complete search history.

(56) References Cited

U.S. PATENT DOCUMENTS

| 6,773,848 | B1 * | 8/2004 | Nortoft et al. ................. 429/158 |
| 8,358,110 | B2 * | 1/2013 | Rouvala et al. ................. 320/166 |
| 8,427,813 | B2 * | 4/2013 | Lu et al. ........................ 361/502 |

(Continued)

FOREIGN PATENT DOCUMENTS

| EP | 1 973 188 A | 9/2008 |
| JP | 2009-016787 A | 1/2009 |

(Continued)

OTHER PUBLICATIONS

Search Report issued by French Patent Office for priority application FR 1255976 dated Apr. 11, 2013.

*Primary Examiner* — Nguyen T Ha
(74) *Attorney, Agent, or Firm* — Frommer Lawrence & Haug LLP; Ronald R. Santucci

(57) ABSTRACT

The arrangement for supercapacitor device comprises an electrode (1) provided with an electrically conductive element (4). It also comprises a separator element (3) fixed against a first face (4a) of the electrically conductive element (4), the arrangement being perforated with a plurality of through holes (5) which pass through both the electrically conductive element (4) and the separator element (3). The perforated separator element (3) forms a membrane that is both electrically insulating and porous to ions of an electrolyte of the supercapacitor device. The electrically conductive element (4) of the electrode (1) being perforated, the equivalent surface area of the electrodes of the supercapacitor device is dependent on the number of holes made and on their depth.

16 Claims, 5 Drawing Sheets

(51) Int. Cl.
*H01G 11/52* (2013.01)
*B82Y 99/00* (2011.01)

(56) References Cited

U.S. PATENT DOCUMENTS 8,737,038 B1 * 5/2014 Irvin et al. .................... 361/502
8,859,143 B2 * 10/2014 Zhamu et al. ................. 429/215
2009/0029257 A1 * 1/2009 Ando et al. ............... 429/231.95
2009/0147442 A1 * 6/2009 Hiroi et al. .................... 361/502
2009/0246626 A1 10/2009 Tasaki et al.
2011/0043967 A1 2/2011 Kim et al.

FOREIGN PATENT DOCUMENTS

JP 2009-199962 A 9/2009
JP 2010-087290 A 4/2010

* cited by examiner

ARRANGEMENT FOR SUPERCAPACITOR DEVICE, SUPERCAPACITOR DEVICE COMPRISING THE ARRANGEMENT, METHOD FOR FABRICATING AN ARRANGEMENT

TECHNICAL FIELD OF THE INVENTION

The invention relates to the field of supercapacitors.

The subject of the invention is, more particularly, an arrangement for supercapacitor device comprising an electrode provided with an electrically conductive element.

STATE OF THE ART

As illustrated in FIG. 1, supercapacitors, or pseudocapacitive supercapacitors, comprise two porous electrodes 1a, 1b, generally made of active carbon. These electrodes 1a, 1b are separated by an electrolyte 2, and are impregnated with this electrolyte 2. The electrolyte 2 can be an organic liquid, an ionic liquid or even an ionogel. A separator element 3, positioned in the electrolyte 2, acts as an electrically insulating membrane to avoid short circuits between the electrodes 1a, 1b, and this membrane is also porous to the ions of the electrolyte 2 for the supercapacitor to operate correctly. This separator element 3 can be produced for example in polypropylene (PP) or in polyethylene (PE) or in a multilayer such as PP/PE/PP, but it can also be formed by a cellulosic membrane implementing cellulosic paper with reinforcing polymer fibres.

The capacitance of a supercapacitor is determined primarily by the geometry of the windings forming its specific surface area S (the active surface, facing one another, of the two electrodes of the supercapacitor that are used for the exchanges), by a distance e separating the electrodes, and from the nature of the insulator(s) used to produce the separator element (by taking $\epsilon_0$ to be the dielectric permittivity of vacuum=8.854 pF m$^{-1}$). The following formula is used to estimate the value of the capacitance C of the supercapacitor:

$$C = \epsilon_0 S/e$$

In the case of a supercapacitor with an electrolyte and a separator, the formula is expressed:

$$C = \epsilon_{re} \epsilon_{rs} \epsilon_0 S/e$$

where $\epsilon_{re}$ represents the permittivity of the electrolyte, this permittivity being able to be between 3 and 40 for most of the organic solvents, and $\epsilon_{rs}$ represents the permittivity of the separator.

This example is based on an electrochemical supercapacitor, but the same principle applies for a pseudocapacitive-type supercapacitor based on the double-layer concept.

Generally, an electrode as described above is formed by a plate of aluminium on which is deposited an active carbon which has a specific surface area S of 2000 m$^2$ to 3000 m$^2$ per gram. The contact surface area of the duly formed electrode is immense, making it possible to obtain considerable capacitance values.

This technology is difficult to miniaturize. Microelectronics may be a solution but the carbon usually used is not a good candidate for microelectronic use where silicon is generally preferred.

The supercapacitors as described above implement many compounds that have to be manipulated (electrodes, separator element and electrolyte), a manipulation that becomes all the more difficult when it comes to miniaturization. This miniaturization then leads to problems in assembly.

OBJECT OF THE INVENTION

The aim of the present invention is to propose a solution that can easily be industrialized, and in which the handling is made easier in assembly.

This aim is targeted in that the arrangement comprises a separator element fixed against a first face of the electrically conductive element, the arrangement comprising a plurality of through holes which pass through both the electrically conductive element and the separator element, and the holed separator element forms a membrane that is both electrically insulating and porous to ions of an electrolyte of the supercapacitor device, and in that the electrically conductive element of the electrode being perforated, the equivalent surface area of the electrodes of the supercapacitor device is dependent on the number of holes made and on their depth According to one implementation, the electrode comprises a plurality of nano-elements, in particular electrically conductive nanowires or nanotubes, extending from a second face of the electrically conductive element, which is opposite to the first face of the electrically conductive element.

Advantageously, the separator element is a dielectric layer comprising holes, for example a layer of oxide with a thickness greater than 1 nm.

Advantageously, the electrode comprises a semiconductor material or a metal.

According to one implementation, at least one through hole from the plurality of through holes of the arrangement comprises a section where the separator element covers a portion of the electrically conductive element along the axis of said hole.

The invention also relates to a supercapacitor device comprising an arrangement in which one face of the separator element, opposite to the face of the separator element in contact with the electrically conductive element, is in contact with an electrolyte of the supercapacitor device.

Advantageously, the free end of at least one nano-element is in contact with the separator element of another arrangement.

According to one implementation, the device comprises a plurality of arrangements, two adjacent arrangements being separated by electrolyte so as to form a unitary supercapacitor element, the electrolyte of the unitary element being in contact with the separator element of one of the arrangements of the unitary element and with the electrode of the other arrangement of the unitary element.

Preferably, at least a part of the plurality of arrangements forms a first set of unitary supercapacitor elements electrically linked in parallel.

Advantageously, another part of the plurality of arrangements forms a second set of unitary supercapacitor elements electrically linked in parallel, the first set and the second set being electrically linked in series.

According to one implementation, the device comprises, for each electrode, a link element electrically linked to said electrode by wiring of ultrasonic microelectronic type or by thermocompression.

The invention also relates to a method for fabricating at least one arrangement for supercapacitor device comprising the following steps:

providing an electrically conductive substrate, in particular semiconductor-based, at least a part of which is intended to form the electrically conductive element of the arrangement, forming, on a first face of the substrate, a layer of electrically insulating material, at least a part of which is intended to form the separator element of the arrangement, forming a plurality of through holes passing through both the substrate and the layer of electrically insulating material.

Advantageously, the method comprises a step of formation of a plurality of nano-elements extending from a second face of the substrate, which is opposite to the first face of the substrate, said nano-elements being obtained by growth from bumps of catalysts arranged on the second face of the substrate.

The bumps of catalysts can be formed before the formation of the plurality of holes.

If the substrate is a metal, the bumps of catalyst are formed by the metal remaining between the through holes after the formation of the plurality of holes.

According to a particular implementation, the step of formation of the plurality of nano-elements comprises:

a step of deposition of a layer of catalyst on the second face of the substrate, said layer of catalyst being intended to form the bumps of catalyst, the step of deposition of the layer of catalyst being carried out before the formation of the plurality of holes so that each hole from the plurality of holes also passes through said layer of catalyst, a step of remelting of the layer of catalyst, carried out after the formation of the plurality of holes, so as to form a plurality of bumps of catalyst, in particular of catalyst balls, on the second face of the substrate, a step of growth of the nano-elements from the bumps of catalyst.

BRIEF DESCRIPTION OF THE DRAWINGS

Other advantages and features will become more clearly apparent from the following description of particular embodiments of the invention, given as non limiting examples and represented in the appended drawings, in which.

DESCRIPTION OF PREFERRED
EMBODIMENTS OF THE INVENTION

Figure 1:
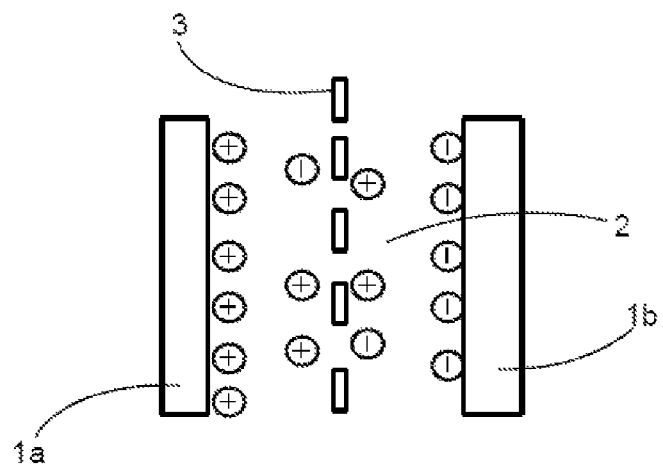
FIG. 1 is a view schematically illustrating the prior art.
Figure 2:
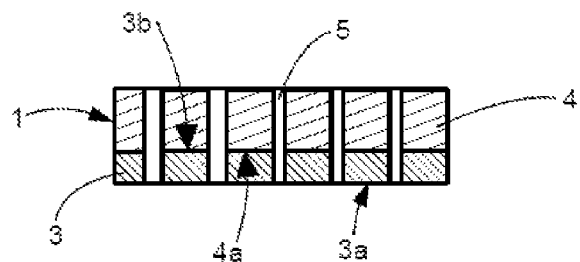
FIG. 2 is a cross-sectional view of an embodiment of an arrangement according to the invention.

In FIG. 2, an arrangement for supercapacitor device comprises an electrode 1 provided with an electrically conductive element 4. Furthermore, the arrangement comprises a separator element 3 fixed against a first face 4a of the electrically conductive element 4. The arrangement comprises ("comprises" can be understand as "is perforated with" or "is bored with" or "is holed with") a plurality of through holes 5 passing through both the electrically conductive element 4 and the separator element 3. Preferably, all the holes in the plurality of holes are through holes, but other holes not belonging to the plurality of holes may be present, and these holes may, for example, be blind.

In fact, the separator element 3 that is perforated (or bored or holed), and thus associated with the electrode 1, forms a membrane that is both electrically insulating and porous to ions of an electrolyte of the supercapacitor device. The dimensions of the holes will therefore be adapted to produce the function of the separator element 3. In fact, the electrical insulation is produced by the thickness of the layer forming the separator element.

Preferably, the porosity of the separator element 3 to ions of the electrolyte of the supercapacitor device is made only by the parts of through holes 5 delimited by the separator element 3. In other words, the solid parts (solid matter) of the separator element between the corresponding parts of through holes do not allow the ions to move to the electrode (the ions can thus only pass in the corresponding holes). Thus, the through holes 5 are dimensioned to allow the movement of ions of the electrolyte of the supercapacitor device.

Thus, the arrangement forms a monolithic component, by virtue of the fixing of the separator element 3 to the electrode 1, comprising the functions of an electrode and of a separator element, this arrangement making it possible to optimize all the quantities that make up a supercapacitor (S, e, $k_{ox}$: relative permittivity linked to the material used in the context of the separator element). This arrangement reduces the number of parts to be manipulated since the functions are combined, and the assembly of the supercapacitor device implementing such an arrangement is therefore simplified.

Furthermore, this particular arrangement makes it possible to reduce the distance e between the electrodes of a supercapacitor device. Electrically speaking, e can be reduced until contact is made between the electrode of one arrangement and the separator element of another arrangement, since the separator element 3 is electrically insulating. However, to maintain the supercapacitor effect, it is essential to maintain a little electrolyte, and it is therefore preferable to keep a distance of a few nanometres, for example a distance greater than 2 nm, so as to separate the electrode of an arrangement with the separator element from another arrangement. This is advantageous inasmuch as, by taking into account the separator element, the capacitance of the capacitor is defined by $C = k_{ox} \in_r \in_0 S/e$; and if e is very small, it is easier to maximize the capacitance of the supercapacitor device while favouring its miniaturization.

Furthermore, the electrically conductive element 4 of the electrode 1 being perforated, this increases the equivalent surface area $S_{eq}$ of the electrodes which is dependent on the number of holes made and on their depth ($S_{eq} = z * S_0$ where z represents a multiplying coefficient obtained by virtue of the presence of the holes, with $S_0$ being the initial hole-free total active surface area).

Thus, we can understand that the perforation of the electrode 1 is the consequence of the presence of through holes 5. In other words, the parts of through holes 5 delimited by the electrode (and more particularly by the electrically conductive element) allow the increase of the surface of corresponding electrode intended to be in contact with the electrolyte, and thus to increase the equivalent surface area of the electrodes of the supercapacitor device.

As an example, by considering holes with a diameter $\phi_t$ greater than or equal to 100 nm, it is possible to obtain a hole density $d_t$ greater than or equal to $10^{10}$ holes per $cm^2$. Depending on the thickness of the electrically conductive element 4 of the electrode 1, the depth $P_t$ of the holes could be between 100 μm and 500 μm. By taking $S_0$ as the surface area of the electrodes without holes, an equivalent surface area $S_{eqt}$ with holes is obtained, given by the formula:

$$S_{eqt} = S_0\left[1 + \pi\frac{\phi_t}{4}d_t(4P_t - \phi_t)\right].$$

According to an example, by taking $d_t=10^{14}$ holes per m², $P_t=500$ μm, $\phi_t=100*10^{-9}$ m, and $S_0=1$ cm², $S_{eqt}=1.5$ m² is obtained, i.e. 1.5 $10^4$ times $S_0$. This makes it possible to greatly increase the capacitance of the supercapacitor when $S_{eqt}$ is injected into the equation giving C. $S_{eqt}$ corresponds to the active surface area, that is to say to two facing surfaces of two electrodes facing one another.

Figure 3:
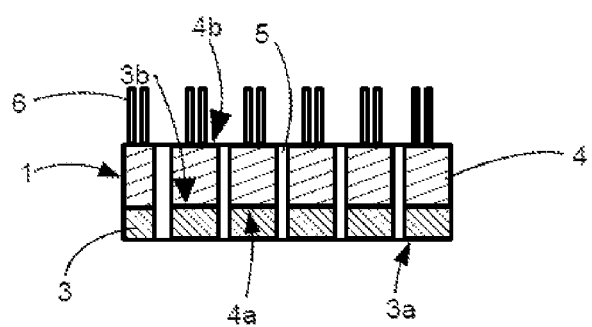
FIG. 3 illustrates a refinement of the embodiment of FIG. 2.

In FIG. 3, in order to improve the equivalent surface area of the electrode 1, the latter may comprise a plurality of nano-elements 6, in particular electrically conductive nanowires or nanotubes, extending from a second face 4b of the electrically conductive element 4, which is opposite to the first face 4a of the electrically conductive element 4 where the separator element 3 is fixed. The arrangement being perforated (or bored or holed) by a plurality of through holes 5 whose orifices open out on the second face 4b of the electrically conductive element, these nano-elements 6 extend from areas of the second face 4b that are situated between the orifices. Obviously, the nano-elements 6 are in electrical contact with the electrically conductive element 4 so as to form the electrode 1.

In the case where nanowires are added, the equivalent surface area ($S_{eqt+f}$) is given by the following formula:

$$S_{eqt+f} = S_0\left[1 + \pi\frac{\phi_t}{4}d_t(4P_t - \phi_t) + \pi\frac{\phi_f}{4}d_f(\phi_f + 4H_f)\right]$$

with the diameter $\phi_t$ of the holes, the density $d_t$ of the holes, the depth $P_t$ of the holes, by taking nanowires of diameter $\phi_f$ greater than or equal to 2 nm, the density of the nanowires $d_f$ will then be greater than or equal to $10^{10}$ nanowires per cm², and the height $H_f$ of the nanowires may be greater than or equal to 100 nm.

According to an example, by taking $d_t=10^{14}$ holes per m², $P_t=500$ μm, $\phi_t=100*10^{-9}$ m, $d_f=10^{14}$ holes per m², $H_f=1$ μm, $\phi_f=5\ 10^{-9}$ m, and $S_0=1$ cm², we obtain for $S_{eqt+f}=3$ m², i.e. $3*10^4$ times $S_0$. It is therefore clear that the use of the nanowires in combination with the holes will be preferred to maximize the capacitance of the supercapacitor device.

It will be understood from what has been stated above that any known type of nano-element or nanostructure that can be used to improve the effective surface area of the electrode will be able to be used. Consequently, a person skilled in the art of microelectronics will be able to use his or her general knowledge to adapt existing nano-elements to the arrangement as described.

The electrode may comprise a semiconductor material or a metal. This semiconductor material may at least form the electrically conductive element 4 of the electrode 1. Thus, the electrode may be formed wholly or partly by a material chosen from silicon, germanium, an alloy based on SiGe, gallium arsenide or nitride (GaAs or GaN), or even indium phosphide (InP). This semiconductor may be strongly doped so as to be electrically conductive. This offers the advantage of making it easier to make use of the technologies of microelectronics in order to miniaturize the supercapacitor devices in order, for example, to integrate them on a chip. The electrode may also be a metal such as, for example, stainless steel, Ni, Al, Cu, etc.

The separator element 3 may be a perforated (or bored or holed) dielectric layer (in other words a dielectric layer with holes), for example a layer of oxide with a thickness greater than 1 nm, and for example between 2 nm and 3 nm. This oxide may, for example, be a dielectric film of $SiO_2$, $Si_yN_x$, etc. By using a layer of oxide associated with the electrode 1 as separator element 3, it is possible to optimize the value e of a supercapacitor device implementing the arrangement described only as a function of the breakdown voltage of the dielectric layer, which is a function of resistivity. For example, for $SiO_2$, the value of the resistivity is between $10^{12}$ and $10^{18}$ Ω·m. Consequently, it is possible to obtain a layer of oxide greater than a nanometre. This will allow for great ease of assembly. $k_{ox}$ will depend on the oxide which will be formed on the electrically conductive element 4 of the electrode 1 (for $SiO_2$, the coefficient $k_{ox}=3.9$). It is also possible to use oxides with high permittivity ("high k") to increase the capacitance of a supercapacitor device and/or to reduce the thickness of the insulating layer.

When the electrically conductive element 4 is produced based on conductive material such as strongly doped silicon, the separator element may be obtained by oxidation of the electrically conductive element 4, or by deposition of a dielectric film on one face of the electrically conductive element 4.

Figure 4:
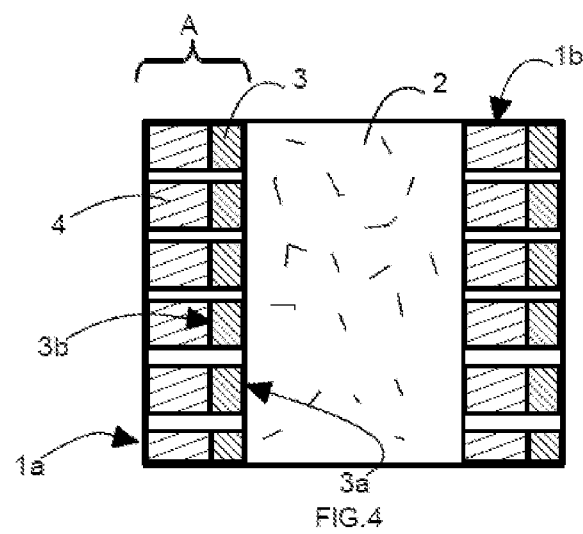
FIG. 4 illustrates a supercapacitor device implementing two arrangements according to FIG. 2.

In FIG. 4, a supercapacitor device may comprise at least one arrangement A as described previously (such as, for example, those of FIGS. 2 and 3) with one face 3a of the separator element 3, opposite to the face 3b of the separator element in contact with the electrically conductive element 4, is in contact with an electrolyte 2 of the supercapacitor device.

In FIG. 4, the arrangement A comprises an electrode 1a serving, for example, respectively as cathode or anode. Furthermore, the arrangement A is separated by the electrolyte 2 from another electrode 1b serving, for example, respectively as anode or cathode.

When the device comprises an arrangement provided with a plurality of nano-elements as described above, the free end of at least one nano-element is in contact with the separator element of another arrangement of the device. Preferably, a plurality of nano-elements of one arrangement is in contact with the separator element of the other arrangement. This makes it possible to reduce the dimensions of the device. When we do not want to decrease the size of the device, the contact of the plurality of nano-elements from an arrangement with the separator element of another arrangement is not necessary.

Figure 5:
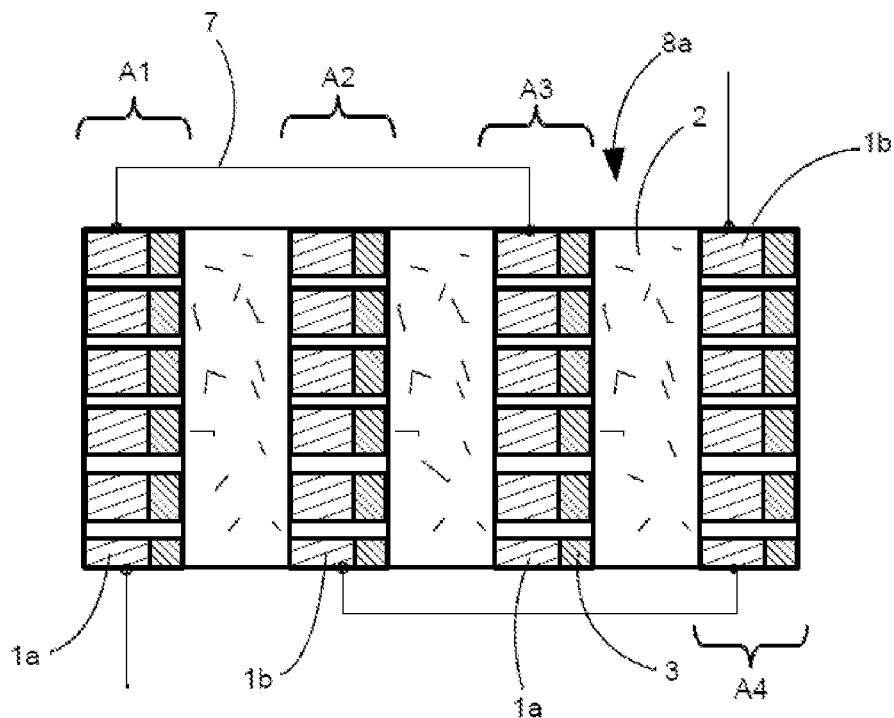
FIG. 5 illustrates a supercapacitor device provided with four arrangements according to FIG. 2.

According to one implementation of the supercapacitor device illustrated in FIG. 5, the latter comprises a plurality of arrangements A1, A2, A3, A4 as described previously. Two adjacent arrangements A3, A4 are separated by electrolyte 2 so as to form a unitary supercapacitor element. The electrolyte 2 of the unitary element (A3, A4, 2) is in contact with the separator element 3 of one of the arrangements of the unitary element (A3, A4, 2) and with the electrode 1b of the other arrangement of the unitary element (A3, A4, 2). In other words, when there are two adjacent arrangements, the face of the electrically conductive element of the electrode of one of the arrangements, opposite to the separator element of the same arrangement, is oriented towards the face of the separator element of the other arrangement, which is opposite to the electrode of the other arrangement.

Moreover, advantageously, the parts of through holes delimited by the electrode (and in particular by the electrically conductive element) allow the movement of the ions of the electrolyte from one side to another of the electrode. Thus, the electrolyte can be common in each side of an arrangement.

FIG. 5 illustrates an example comprising four arrangements A1, A2, A3, A4 without nano-elements stacked one on top of the other. The arrangements are separated in pairs by an electrolyte 2. Obviously, the arrangements could also each comprise nano-elements as defined above in order to increase the capacitance of the supercapacitor device. In fact, the electrolyte 2 mentioned above may form an integral part of a global electrolyte common to all the arrangements, and there is therefore continuity in the ionic conduction of the electrolyte of the different arrangements.

Thus, more generally, and applicable to the different embodiments of supercapacitor device, the electrolyte separating the arrangements in pairs is a part of a global common electrolyte to the arrangements (and preferably to all the arrangements).

According to an implementation illustrated in FIG. 5, at least a part of the plurality of arrangements may form, in particular with the associated electrolyte, a first set 8a of unitary supercapacitor elements electrically linked in parallel. For this, the device may comprise a stack of arrangements formed by an anode/cathode alternation. All the anodes 1a are electrically linked together, and all the cathodes 1b are electrically linked together. This first set may, preferably, comprise all the arrangements of the plurality of arrangements of the supercapacitor device.

In the case of a parallel arrangement as described comprising 2n electrodes each having an individual capacitance Ci, and an internal resistance ½ Ri, an alternate connection yields two subsets of n electrodes in series with a capacitance nCi. The overall capacitance C of the parallel arrangement is such that:

$$1/C = 1/nCi + 1/nCi$$

Consequently, the capacitance C of the set is C=½ nCi, the stored energy E is E=¼ nCiU², and the power P is P=U²/4Rs=U²/4nRi, with Rs=nRi (Rs being the total series resistance, also corresponding to the internal resistance plus the substantially negligible contact resistances), U the voltage at the terminals of the stack identical to that of a unitary element consisting of two electrodes. This configuration favours the capacitance of the supercapacitor device.

Figure 6:
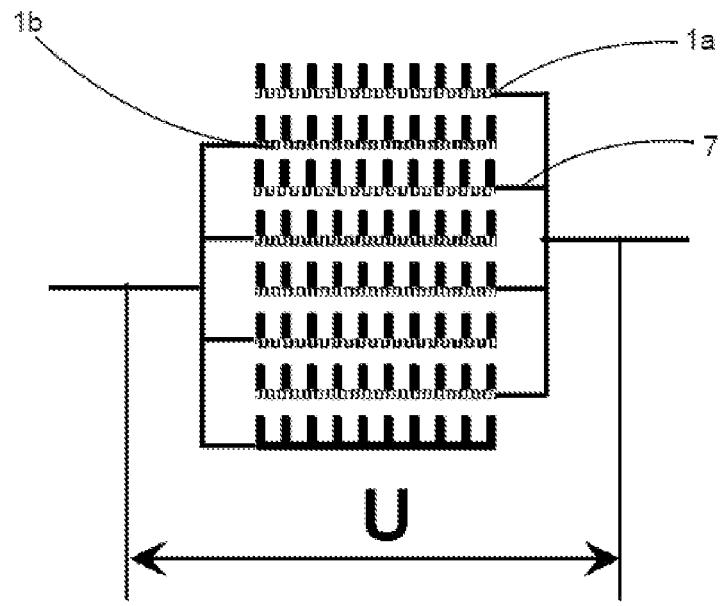
FIG. 6 illustrates a set of unitary supercapacitor elements electrically linked in parallel to favour the capacitance of the supercapacitor device.

FIG. 6 gives a more detailed illustration of a parallel arrangement based on eight electrodes provided with nanowires on one face and covered by the separator element on another face opposite to that of the nanowires, one in every two of these electrodes being interconnected. This therefore yields, a half-set of electrodes 1a that are electrically linked together and another half-set of electrodes 1b that are electrically linked together. In this configuration, n=4 and C=2Ci, E=CiU²; P=U²/16Ri. In this example with eight arrangements, there are seven unitary elements.

Figure 7:
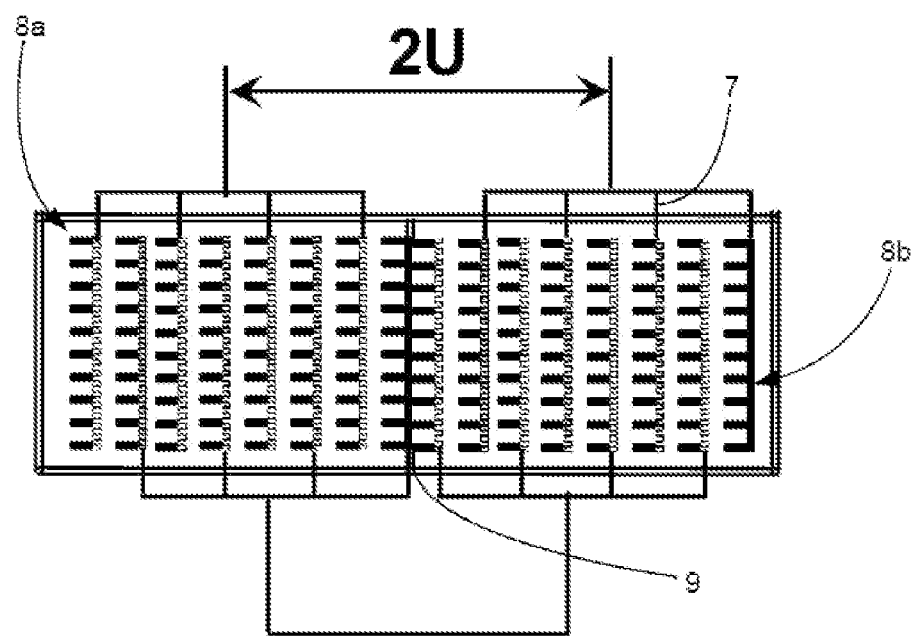
FIG. 7 illustrates two sets according to FIG. 6 linked in series to favour the voltage of the supercapacitor device while keeping a high capacitance.
Figure 8:
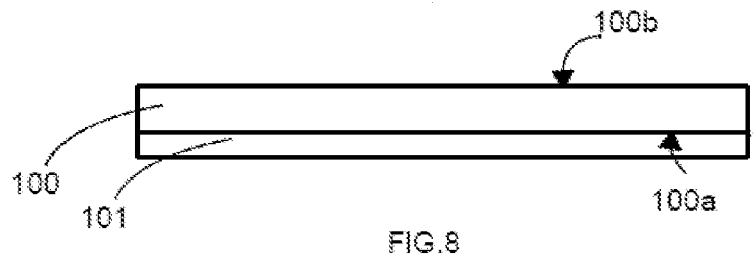
FIGS. 8 to 11 illustrate different steps of a method for fabricating an arrangement.
Figure 9:
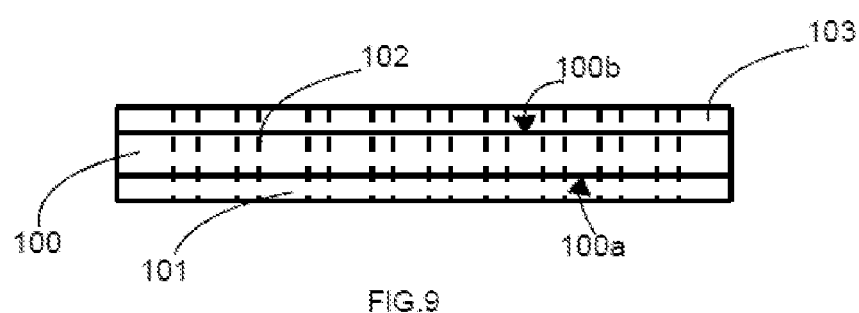
Figure 10:
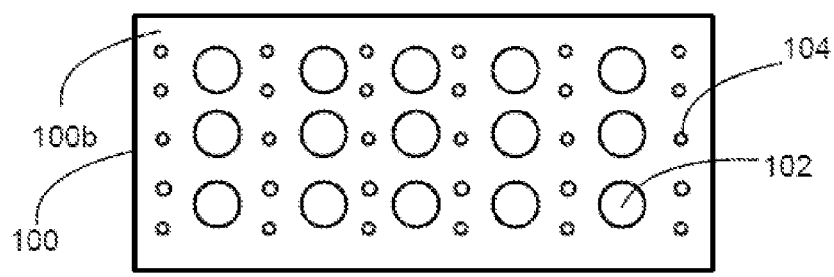
Figure 11:
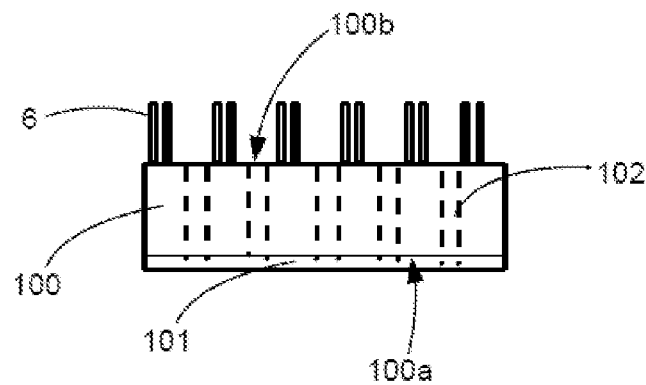

According to a particular implementation illustrated in FIG. 7, only a part of the plurality of arrangements forms the first set 8a of unitary elements electrically linked in parallel, so another part of the plurality of arrangements of the device may form a second set 8b of unitary supercapacitor elements electrically linked in parallel, the first and second sets being electrically linked in series. This makes it possible to increase the voltage of the device while retaining a high capacitance. The example given is of two sets of unitary supercapacitor elements, but a person skilled in the art will be able to adapt the number of sets according to the desired electrical capacitance and/or voltage characteristics of the supercapacitor device.

Preferably, in this particular implementation, the first and second sets of unitary supercapacitor elements are separated so as to prevent the ionic conduction between the electrolyte of the first set 8a and the electrolyte of the second set 8b. This separation allows for the series arrangement. For this, the first and second sets 8a, 8b may each be sealed in an electrolyte container configured to avoid short circuits between the arrangements of one and the same container, and to allow the ions of the electrolyte to pass between the arrangements of the different unitary supercapacitor elements of one and the same container. The two sets may be secured to one another by an electrically insulating plate 9, for example in contact with a first electrode type of the first set and a second electrode type of the second set. This plate 9 produces a sealing function between the containers.

Preferably, the supercapacitor device comprises, for each electrode 1a, 1b, a link element 7 (FIGS. 5, 6 and 7) electrically linked to said electrode 1a, 1b by wiring of ultrasonic microelectronic type or by thermocompression.

As illustrated in FIGS. 8 to 11, the arrangement for supercapacitor device can be produced according to a method for fabricating at least one arrangement comprising a step in which an electrically conductive substrate 100, in particular semiconductor-based and preferably strongly doped, is provided. At least a part of this substrate 100 is intended to form the electrically conductive element of the arrangement. The method also comprises a step of formation, on a first face 100a of the substrate 100, of a layer of electrically insulating material 101, at least a part of which is intended to form the separator element, and a step of formation of a plurality of through holes 102 (FIG. 9) passing through both the substrate 100 and the layer of electrically insulating material 101.

In fact, the substrate 100 may be a silicon wafer commonly used as substrate in microelectronics.

The entire set obtained at the end of the method will be able to be used as a single arrangement, or will be able to be segmented into a plurality of identical arrangements intended to be stacked with the interposition of electrolyte.

The layer of electrically insulating material 101 may be a layer of oxide. This layer of oxide may be produced by chemical or thermal oxidation (formation of $SiO_2$ of nanometric thickness) of the substrate 100. The chemical pathway consists in dipping the substrate in an oxidizing acid solution (sulphuric acid, nitric acid), the oxidation reaction will be self-limited by the formation of a nanometric layer of $SiO_2$ if the substrate is made of silicon. The thermal pathway consists in performing a thermal annealing (or bake) in an oxidizing atmosphere. This technique is totally controlled in the microelectronics industry, and makes it possible to produce $SiO_2$ layers of the order of a nanometre starting from a substrate 100 of silicon. This layer of oxide may alternatively be produced by a nanometric conformal deposition by gaseous means or evaporation of different dielectrics such as $SiO_2$, $Si_yN_x$, etc. It will be possible to provide a preliminary step of deposition of a protection layer on the face that is not involved, or a later step to clean this face.

According to the implementation using nano-elements, the method may comprise a step of formation of a plurality of nano-elements 6 (FIGS. 9 to 11) extending from a second face 100b of the substrate 100, which is opposite to the first face 100a of the substrate 100, said nano-elements being obtained by growth from bumps of catalysts arranged on the second face 100b of the substrate 100.

Advantageously, the bumps of catalysts are formed before the formation of the plurality of holes.

According to one implementation, the substrate being a metal, the bumps of catalyst are formed by the metal remaining between the through holes after the formation of the plurality of through holes.

Advantageously, the step of formation of the plurality of nano-elements may comprise a step of deposition of a layer of catalyst 103 on the second face 100b of the substrate 100 (FIG. 9), said layer of catalyst 103 being intended to form the bumps of catalyst, such as, for example, nanowires or nanotubes, from the substrate 100. The step of deposition of the layer of catalyst 103 is performed before the formation of the plurality of through holes so that the latter also pass through said layer of catalyst 103. This layer of catalyst 103 may be a layer of gold, of copper, of aluminium, etc. The layer of catalyst 103 will advantageously be deposited by uniform deposition controlled by evaporation (for example by physical vapour-phase deposition PVD). A step of remelting of the layer of catalyst 103, performed after the formation of the plurality of holes 102, makes it possible to form a plurality of bumps of catalyst, in particular of balls 104 of catalyst (FIG. 10), on the second face 100b of the substrate 100. In fact, this remelting step makes it possible to anneal the whole pierced from side to side, and in this heat treatment, the layer of catalyst 103 changes to the liquid state and dewets into small droplets 104. Depending on the initial thickness of the layer of catalyst 103, a more or less broad distribution of the sizes of droplets 104 is obtained. Finally, the step of formation of the plurality of nano-elements 6 comprises a step of growth of the nano-elements, from the bumps 104 of catalyst. This growth step is performed conventionally, for example by metal organic chemical vapour-phase deposition "MOCVD".

The nano-elements will generally also be made of doped silicon like the substrate 100. These nano-elements may also be made of Ge, of an alloy of Si and Ge, of GaAs, of GaN, of Inp, etc.

Generally, the formation of the plurality of through holes can be performed, for example, by lithoetching based on the exposure of thin layers of organic resins to light, X-rays, or an electron beam followed by having them revealed in solvents. Then, an etching step is undertaken either by "wet or chemical" means by using a hydrofluoric acid, or by "dry" means by using ion bombardment.

After the production of the holes, if an organic resin has been used, the latter can be removed. This removal will be performed before the step of formation of the plurality of nano-elements.

According to a variant, the layer of electrically insulating material 101 is produced after having pierced the substrate 100 from side to side. In this particular case, the step of deposition of the layer of electrically insulating material 101 is concomitant with the formation of through holes passing through both the substrate 100 and the layer of electrically insulating material 101. This deposition will be able to take place before the removal of any layer of organic resin that might have been used in the litho-etching. This has the effect of partially protecting, particularly by oxidation, the hole at the level of the substrate. The advantage thus obtained is the avoidance of a short circuit between two electrodes if, during assembly, a nano-element were to penetrate into a hole.

Figure 12:
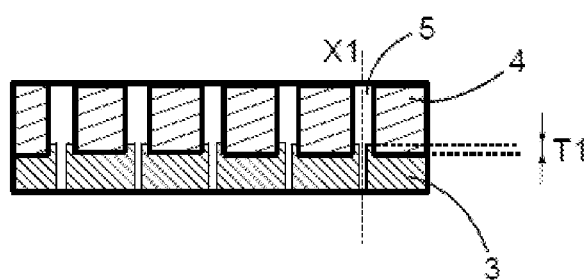
FIG. 12 illustrates a cross-sectional view of a particular embodiment of an arrangement.

In other words, as illustrated in FIG. 12, on an arrangement, at least one through hole 5 from the plurality of through holes of the arrangement comprises a section $T_1$ where the separator element 3 covers a portion of the electrically conductive element 4 along the axis $X_1$ of said hole. Obviously, preferably, all the holes in the plurality of holes are thus produced.

Although no nano-element is represented in FIG. 12, nano-elements may advantageously extend from the face of the electrically conductive element 4 which is opposite to the separator element 3.

In order to best control the coverage at the section $T1$, it is possible to prepare the face of the substrate 100 which is intended to receive the layer 101 of insulating material by producing blind holes in the position of each future through hole. Then, the layer 101 is deposited so as to cover the relevant face of the substrate and the blind holes. Finally, the substrate is pierced at each blind hole so as to form the plurality of through holes while providing the coverage indicated above. In this case, the blind hole has a diameter greater than the associated future through hole.

Moreover, it is understood that a method for fabricating a supercapacitor device as described can comprise at least one step of fabricating an arrangement as described. This step of fabricating the arrangement is thus equivalent to the method for fabricating at least one arrangement as described before.

A computer-readable data storage medium, on which is stored a computer program, may comprise computer program code means for implementing the steps of the method as described above.

A computer program may comprise a computer program code means suitable for carrying out the steps of the method as described, when the program is run by a computer.

As indicated previously, the arrangement described above can be implemented in a supercapacitor device. Such a supercapacitor device may be of pseudocapacitive type, of metal oxide-based type, of a type based on intrinsic electronic conductive polymer or of asymmetric type.

What is claimed is:

1. Arrangement for supercapacitor device, said arrangement comprising an electrode provided with an electrically conductive element, wherein it comprises a separator element fixed against a first face of the electrically conductive element, the arrangement comprising a plurality of through holes which pass through both the electrically conductive element and the separator element, and in that the holed separator element forms a membrane that is both electrically insulating and porous to ions of an electrolyte of the supercapacitor device, and in that the electrically conductive element of the electrode being perforated, the equivalent surface area of the electrodes of the supercapacitor device is dependent on the number of holes made and on their depth.

2. Arrangement according to claim 1, wherein the electrode comprises a plurality of nano-elements, in particular electrically conductive nanowires or nanotubes, extending from a second face of the electrically conductive element, which is opposite to the first face of the electrically conductive element.

3. Arrangement according to claim 1, wherein the separator element is a dielectric layer comprising holes, for example a layer of oxide with a thickness greater than 1 nm.

4. Arrangement according to claim 1, wherein the electrode comprises a semiconductor material or a metal.

5. Arrangement according to claim 1, wherein at least one through hole from the plurality of through holes of the arrangement comprises a section where the separator element covers a portion of the electrically conductive element along the axis of said hole.

6. Supercapacitor device comprising at least one arrangement according to claim 1, in which one face of the separator element, opposite to the face of the separator element in contact with the electrically conductive element, is in contact with an electrolyte of the supercapacitor device.

7. Device according to claim 6 comprising an arrangement for supercapacitor device, said arrangement comprising an electrode provided with an electrically conductive element, wherein it comprises a separator element fixed against a first face of the electrically conductive element, the arrangement comprising a plurality of through holes which pass through both the electrically conductive element and the separator element, and in that the holed separator element forms a membrane that is both electrically insulating and porous to ions of an electrolyte of the supercapacitor device, and in that the electrically conductive element of the electrode being perforated, the equivalent surface area of the electrodes of the supercapacitor device is dependent on the number of holes made and on their depth, wherein the electrode comprises a plurality of nano-elements, in particular electrically conductive nanowires or nanotubes, extending from a second face of the electrically conductive element, which is opposite to the first face of the electrically conductive element, wherein the free end of at least one nano-element is in contact with the separator element of another arrangement.

8. Device according to claim 6, wherein it comprises a plurality of arrangements, two adjacent arrangements being separated by electrolyte so as to form a unitary supercapacitor element, the electrolyte of the unitary element being in contact with the separator element of one of the arrangements of the unitary element and with the electrode of the other arrangement of the unitary element.

9. Device according to claim 8, wherein at least a part of the plurality of arrangements forms a first set of unitary supercapacitor elements electrically linked in parallel.

10. Device according to claim 9, wherein another part of the plurality of arrangements forms a second set of unitary supercapacitor elements electrically linked in parallel, the first set and the second set being electrically linked in series.

11. Device according to claim 6, wherein it comprises, for each electrode, a link element electrically linked to said electrode by wiring of ultrasonic microelectronic type or by thermocompression.

12. Method for fabricating at least one arrangement for supercapacitor device according to claim 1, wherein it comprises the following steps:

providing an electrically conductive substrate, in particular semiconductor-based, at least a part of which is intended to form the electrically conductive element of the arrangement, forming, on a first face of the substrate, a layer of electrically insulating material, at least a part of which is intended to form the separator element of the arrangement, forming a plurality of through holes passing through both the substrate and the layer of electrically insulating material.

13. Method according to claim 12, wherein it comprises a step of formation of a plurality of nano-elements extending from a second face of the substrate, which is opposite to the first face of the substrate, said nano-elements being obtained by growth from bumps of catalysts positioned on the second face of the substrate.

14. Method according to claim 13, wherein the bumps of catalysts are formed before the formation of the plurality of holes.

15. Method according to claim 13, wherein the substrate being a metal, the bumps of catalyst are formed by the metal remaining between the through holes after the formation of the plurality of holes.

16. Method according to claim 13, wherein the step of formation of the plurality of nano-elements comprises:
- a step of deposition of a layer of catalyst on the second face of the substrate, said layer of catalyst being intended to form the bumps of catalyst, the step of deposition of the layer of catalyst being carried out before the formation of the plurality of holes so that each hole from the plurality of holes also passes through said layer of catalyst,
- a step of remelting of the layer of catalyst, carried out after the formation of the plurality of holes, so as to form a plurality of bumps of catalyst, notably of catalyst balls, on the second face of the substrate,
- a step of growth of the nano-elements from the bumps of catalyst.

* * * * *